United States Patent
Robles Flores et al.

(10) Patent No.: US 9,884,449 B2
(45) Date of Patent: Feb. 6, 2018

(54) THREE-DIMENSIONAL PRINTED PART REMOVAL USING AN INTERLACED PLATEN

(71) Applicant: Xerox Corporation, Norwalk, CT (US)

(72) Inventors: Eliud Robles Flores, Rochester, NY (US); Robert B. Anderson, Jr., Syracuse, NY (US); Timothy P. Foley, Marion, NY (US)

(73) Assignee: Xerox Corporation, Norwalk, CT (US)

( * ) Notice: Subject to any disclaimer, the term of this patent is extended or adjusted under 35 U.S.C. 154(b) by 302 days.

(21) Appl. No.: 14/677,233

(22) Filed: Apr. 2, 2015

(65) Prior Publication Data

US 2016/0288416 A1 Oct. 6, 2016

(51) Int. Cl.
| | |
|---|---|
| *B29C 64/00* | (2017.01) |
| *B29C 64/112* | (2017.01) |
| *B29C 64/245* | (2017.01) |
| *B33Y 50/00* | (2015.01) |
| *B29C 64/386* | (2017.01) |
| *B29L 31/00* | (2006.01) |

(52) U.S. Cl.
CPC .......... *B29C 64/112* (2017.08); *B29C 64/245* (2017.08); *B29C 64/386* (2017.08); *B33Y 50/00* (2014.12); *B29L 2031/00* (2013.01)

(58) Field of Classification Search
CPC ..... B29C 67/0055; B33Y 10/00; B33Y 30/00; B29L 2031/00
See application file for complete search history.

(56) References Cited

U.S. PATENT DOCUMENTS

| | | | |
|---|---|---|---|
| 4,052,217 A | 10/1977 | Watkinson | |
| 4,276,008 A * | 6/1981 | Montgomery | ...... B29C 44/3461 264/51 |
| 5,094,095 A | 3/1992 | Barrois et al. | |
| 5,141,680 A | 8/1992 | Almquist et al. | |
| 6,269,938 B1 | 8/2001 | Lutz | |
| 6,571,702 B2 | 6/2003 | Wotton et al. | |
| 8,827,670 B2 * | 9/2014 | Dickens | .................. B29C 43/04 249/113 |
| 8,911,199 B2 | 12/2014 | Herrmann et al. | |
| 2004/0237563 A1 * | 12/2004 | Lee | ........................... F25C 1/04 62/340 |
| 2005/0116391 A1 * | 6/2005 | Lindemann | ......... B29C 67/0077 264/497 |

(Continued)

*Primary Examiner* — Christina A Johnson
*Assistant Examiner* — Andrew D Graham
(74) *Attorney, Agent, or Firm* — Maginot Moore & Beck LLP (57) ABSTRACT

A method of manufacturing a three-dimensional object operates a platen configured to facilitate the release of objects produced by a three-dimensional object printer. The method includes moving a first plate and a second plate to form a platen, the first plate having a plurality of parallel members and the second plate having a plurality of parallel members, the first plate and the second plate being moved to interlock the plurality of parallel members of the first plate with the plurality of parallel members of the second plate to form the platen, at least one of the first plate and the second plate being independently movable. At least one of the first plate and second plate is moved to release a three-dimensional object formed by the printer from the platen.

6 Claims, 7 Drawing Sheets

(56) References Cited

U.S. PATENT DOCUMENTS

| | | | | |
|---|---|---|---|---|
| 2005/0200051 | A1* | 9/2005 | Ricciardelli | B29C 45/14065 264/511 |
| 2007/0126157 | A1* | 6/2007 | Bredt | B29C 67/0077 264/334 |
| 2008/0006334 | A1* | 1/2008 | Davidson | B29C 67/0077 137/571 |
| 2008/0169589 | A1* | 7/2008 | Sperry | B29C 67/0055 264/494 |
| 2008/0211896 | A1* | 9/2008 | Takeuchi | B41J 11/06 347/104 |
| 2010/0262272 | A1* | 10/2010 | Shkolnik | B29C 67/0088 700/120 |
| 2011/0014021 | A1* | 1/2011 | Reid | B65G 65/00 414/389 |
| 2012/0046779 | A1* | 2/2012 | Pax | B29C 67/0055 700/112 |
| 2012/0072006 | A1* | 3/2012 | Knighton | B29C 67/0055 700/119 |
| 2012/0113439 | A1* | 5/2012 | Ederer | B22F 1/0059 358/1.9 |
| 2012/0169001 | A1* | 7/2012 | Ducek | B25H 1/02 269/290 |
| 2013/0026680 | A1* | 1/2013 | Ederer | B29C 67/0077 264/401 |
| 2013/0073073 | A1* | 3/2013 | Pettis | B29C 67/0055 700/119 |
| 2013/0075957 | A1* | 3/2013 | Swanson | B29C 67/0092 264/405 |
| 2014/0048981 | A1* | 2/2014 | Crump | B29C 67/0066 264/401 |
| 2014/0220168 | A1* | 8/2014 | Perez | B29C 37/0007 425/161 |
| 2014/0265032 | A1* | 9/2014 | Teicher | B29C 67/0066 264/401 |
| 2014/0371895 | A1* | 12/2014 | Sadusk | B33Y 10/00 700/98 |
| 2015/0021815 | A1* | 1/2015 | Albrecht | B29C 67/0088 264/235 |
| 2015/0024169 | A1* | 1/2015 | Martin | B29C 67/0092 428/172 |
| 2015/0147424 | A1* | 5/2015 | Bibas | B29C 67/0088 425/150 |
| 2015/0210007 | A1* | 7/2015 | Durand | B29C 67/0051 264/401 |
| 2015/0251351 | A1* | 9/2015 | Feygin | B29C 67/0051 156/267 |
| 2015/0259099 | A1* | 9/2015 | Segal | B29C 67/0092 221/71 |
| 2015/0266157 | A1* | 9/2015 | Summers | B24B 31/062 451/32 |
| 2015/0298396 | A1* | 10/2015 | Chen | B29C 67/0085 425/110 |
| 2016/0059308 | A1* | 3/2016 | Volk | B29C 67/0085 428/615 |
| 2016/0067740 | A1* | 3/2016 | Voris | B29C 67/0055 427/402 |
| 2016/0075091 | A1* | 3/2016 | Cable | B29C 67/0085 528/272 |
| 2016/0263833 | A1* | 9/2016 | Vittitow | B29C 67/0051 |

* cited by examiner

THREE-DIMENSIONAL PRINTED PART REMOVAL USING AN INTERLACED PLATEN

TECHNICAL FIELD

The device and method disclosed in this document relates to three-dimensional object printing and, more particularly, to removal of a three-dimensional object from a platen on which the object was formed.

BACKGROUND

Digital three-dimensional manufacturing, also known as digital additive manufacturing, is a process of making a three-dimensional solid object of virtually any shape from a digital model. Three-dimensional printing is an additive process in which one or more printheads or ejector heads eject successive layers of material on a substrate in different shapes. The substrate is supported either on a platform that can be moved three dimensionally by operation of actuators operatively connected to the platform, or the printhead or printheads are operatively connected to one or more actuators for controlled movement of the printhead or printheads to produce the layers that form the object. Three-dimensional printing is distinguishable from traditional object-forming techniques, which mostly rely on the removal of material from a work piece by a subtractive process, such as cutting or drilling.

Manufacturing of three-dimensional printed parts at high speed is a significant challenge because many of the processes involved are time consuming and often done manually. Automation has provided for higher speed and more efficient processing of three-dimensional printed parts. One area of concern relates to removal of the three-dimensional printed part from the build platen. Often the three-dimensional printed part sticks to the build platen and can be challenging to remove. Current methods for part removal include heating, impacting, scraping, and freezing. These methods are generally cumbersome, time consuming, and risk damaging the part or the build platen. What is needed is a method for removing a three-dimensional printed part from a build platen that is fast, reliable, and easily automated.

SUMMARY

A method of manufacturing a three-dimensional object operates a two-part platen to facilitate the release of objects produced on the platen. The method includes moving a first plate and a second plate to form a platen, the first plate having a plurality of parallel members and the second plate having a plurality of parallel members, the first plate and the second plate being moved to interlock the plurality of parallel members of the first plate with the plurality of parallel members of the second plate to form the platen, at least one of the first plate and the second plate being independently movable, operating a plurality of ejectors to eject drops of material towards the platen and form layers of material with reference to digital image data of a three-dimensional object to produce the three-dimensional object on the platen, and operating at least one of the first plate and the second plate to release the three-dimensional object from the platen.

A printer for manufacturing a three-dimensional object includes a two-part platen configured to facilitate the release of an object from the platen. The printer includes a plurality of ejectors configured to eject drops of material, a first plate having a plurality of parallel members, a second plate having a plurality of parallel members, at least one actuator operatively connected to one of the first and the second plate, and a controller operatively connected to the first plate, the second plate, the at least one actuator and the plurality of ejectors. The controller is configured to operate the at least one actuator to move one of the first plate and the second plate to interlock the plurality of parallel members of the first plate with the plurality of parallel members of the second plate to form a platen, operate the plurality of ejectors to eject drops of material towards the platen and form layers of material with reference to digital image data of a three-dimensional object to produce the three-dimensional object on the platen, and operate at least one of the first plate and the second plate to release the three-dimensional object from the platen.

BRIEF DESCRIPTION OF THE DRAWINGS

The foregoing aspects and other features of method and printer are explained in the following description, taken in connection with the accompanying drawings.

DETAILED DESCRIPTION

For a general understanding of the environment for the method and printer disclosed herein as well as the details for the method and printer, reference is made to the drawings. In the drawings, like reference numerals designate like elements.

Figure 1:
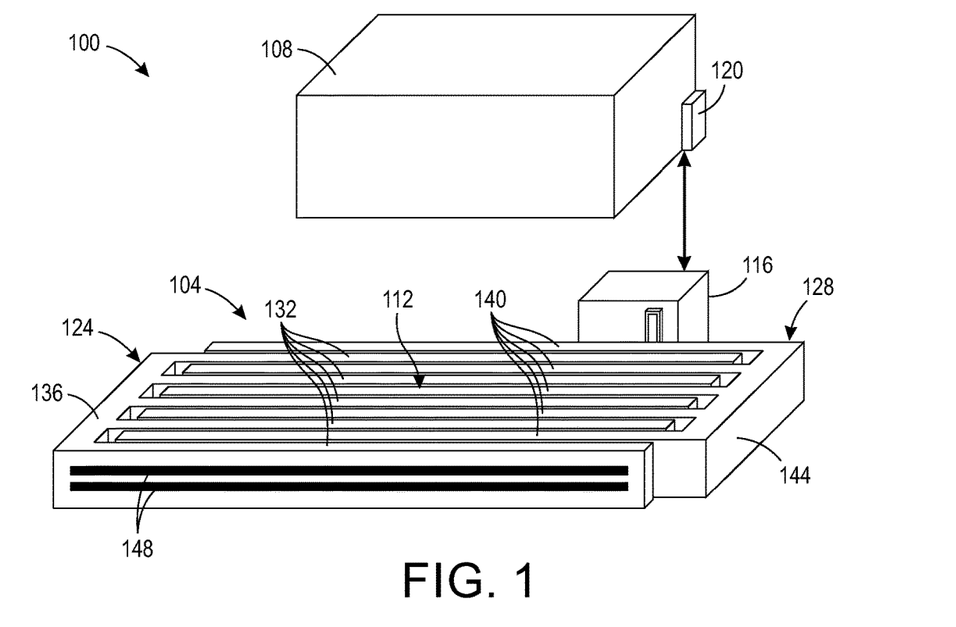
FIG. 1 shows a three-dimensional object printer configured for automated part removal.

FIG. 1 shows a three-dimensional object printer 100 configured for automated part removal. The printer comprises a platen 104 and an ejector head 108. The ejector head 108 has a plurality of ejectors configured to eject material onto a surface 112 of the platen 104. The printer 100 also includes an at least one actuator 116 configured to operate the platen. The printer 100 further includes a controller 120 operatively connected to the ejector head 108 and the actuator 116 and configured to operate the ejector head 108 and the actuator 116.

The platen 104 includes a first plate 124 and a second plate 128. The first plate 124 has a plurality of parallel members 132 that extend from a body 136. Similarly, the second plate 128 has a plurality of parallel members 140 that extend from a body 144. The plurality of members 132 of the first plate 124 is configured to interlock with the plurality of members 140 of the second plate 128 to form the platen 104. In one embodiment, the actuator 116 is configured to move the second plate 128 up and down relative the first plate 124, which is fixed in place. As used herein, "up" refers to a direction that is normal to the surface 112 of the platen 104 and, from the surface 112, points toward the ejector head 108. Similarly, as used herein, "down" refers to a direction that is normal to the surface 112 of the platen 104 and, from the surface 112, points away from the ejector head 108. In one embodiment, the actuator 116 is also configured to pivot the second plate 128 about an axis that is parallel to the surface 112 of the platen 104 and perpendicular to the plurality of parallel members 140 of the second plate 128. In some embodiments, other actuators are included and configured to similarly operate the first plate 124.

In another embodiment, the actuator 116 is configured to move the second plate 128 horizontally relative to the first plate 124. As used herein, "horizontally" means a direction that is parallel to the surface 112 of the platen and parallel with a longitudinal axis of the plurality of parallel members 140 of the second plate 128. In one embodiment, the actuator 116 is also configured to disengage with the second plate 128 to enable complete removal of the second plate 128 from the printer 100. In some embodiments, other actuators are included and configured to similarly operate the first plate 124.

In some embodiments, the printer 100 includes a heater implemented with heating elements 148, which are configured to heat one or both of the first plate 124 and the second plate 128. The controller 120 is operably connected to the heating elements 148 and is configured to operate the heating elements 148 to heat one or both of the first plate 124 and the second plate 128.

Figure 2:
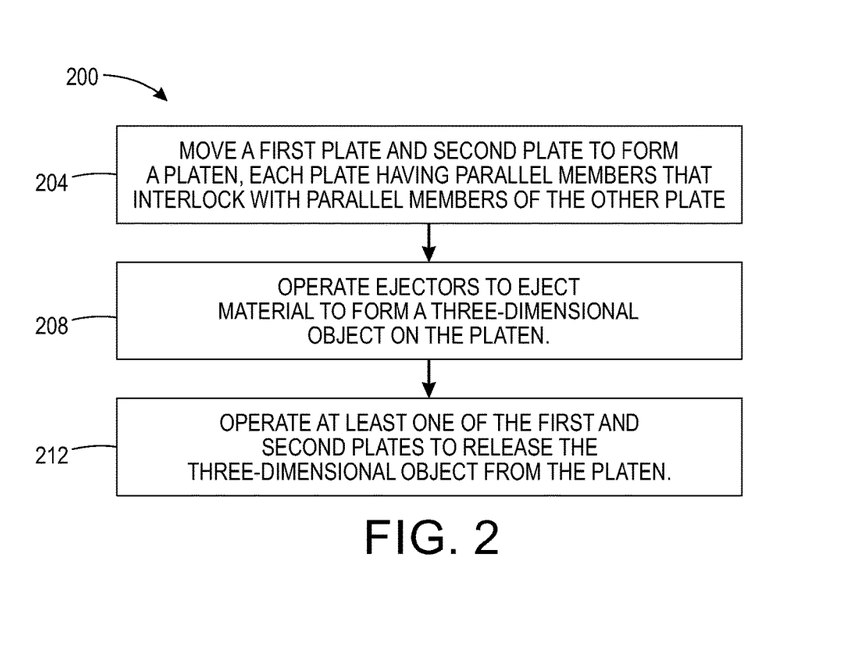
FIG. 2 shows a method for operating a printer to automatically remove printed parts from a platen.

A method 200 for operating the printer 100 to automatically remove printed parts from the platen 104 is shown in FIG. 2. In the description of the method, statements that the method is performing some task or function refers to a controller or general purpose processor executing programmed instructions stored in non-transitory computer readable storage media operatively connected to the controller or processor to manipulate data or to operate one or more components in the printer to perform the task or function. The controller 120 noted above can be such a controller or processor. Alternatively, the controller can be implemented with more than one processor and associated circuitry and components, each of which is configured to form one or more tasks or functions described herein.

Figure 3A:
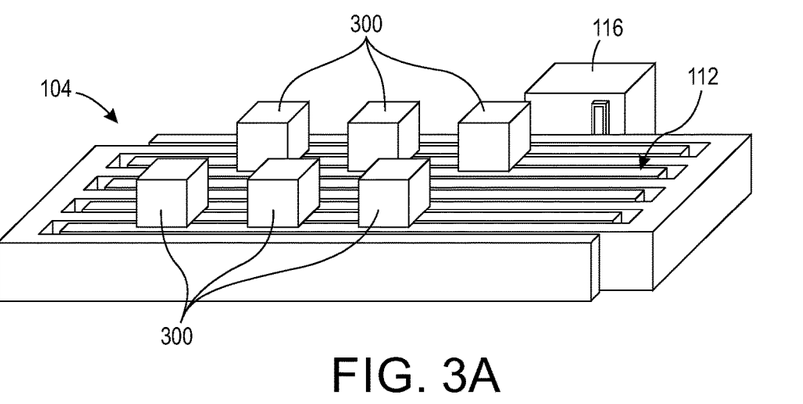
FIGS. 3a and 3b show parts formed on a platen with and without a wax base.
Figure 3B:
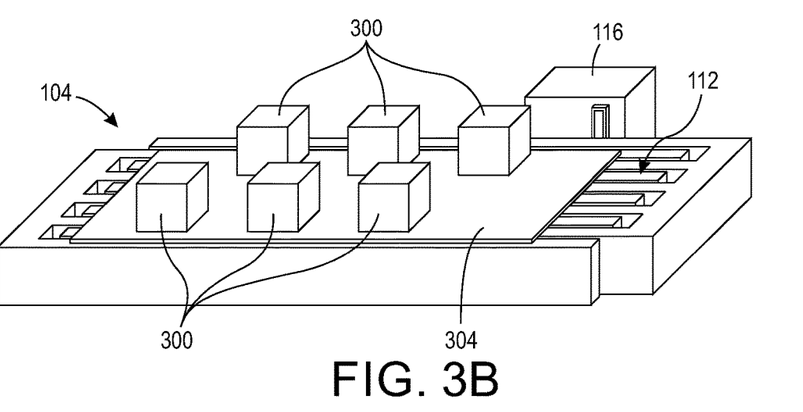

When the method 200 is performed, it begins by moving a first plate and a second plate to form a platen (block 204). The controller 120 operates the actuator 116 to move the second plate 128 into an interlocked position with the first plate 124 to form the surface 112 of the platen 104, as shown in FIG. 1. Next, the method 200 operates ejectors to eject material to form a three-dimensional object on the platen (block 208). In one embodiment, the controller 120 operates a first plurality of ejectors of the ejector head 108 to eject material onto the surface 112 of the platen 104 to form one or more parts 300, shown in FIG. 3a. In some embodiments, each of the parts 300 is formed with a layer of support material separating each part from the platen 104. In another embodiment, the controller 120 first operates a second plurality of ejectors of the ejector head 108 to eject wax onto the surface 112 of the platen 104 to form a wax base 304, shown in FIG. 3b. The wax base 304 has a footprint that is larger than each of the parts 300 such that the parts 300 are all formed on the wax base 304, as shown in FIG. 3b. After forming the wax base 304, the controller 120 operates the first plurality of ejectors of the ejector head 108 to eject material onto the wax base 304 to form the parts 300.

Next, the method 200 operates at least one of the first and second plates to release the three-dimensional object from the platen (block 212). The controller 120 operates the actuator 116 to move the second plate 128 so as to at least partially separate the plurality of parallel members 140 of the second plate 128 from the plurality of parallel members 132 of the first plate 124. In this way, the parts 300 are released from at least one of the first plate 124 and the second plate 128. In some embodiments, discussed below with respect to FIG. 4, the controller 120 further operates the actuator 116 to release the parts 300 from both of the first plate 124 and the second plate 128. In other embodiments, discussed below with respect to FIG. 7, the parts 300 remain stuck to one of the first plate 124 and the second plate 128.

Figure 4:
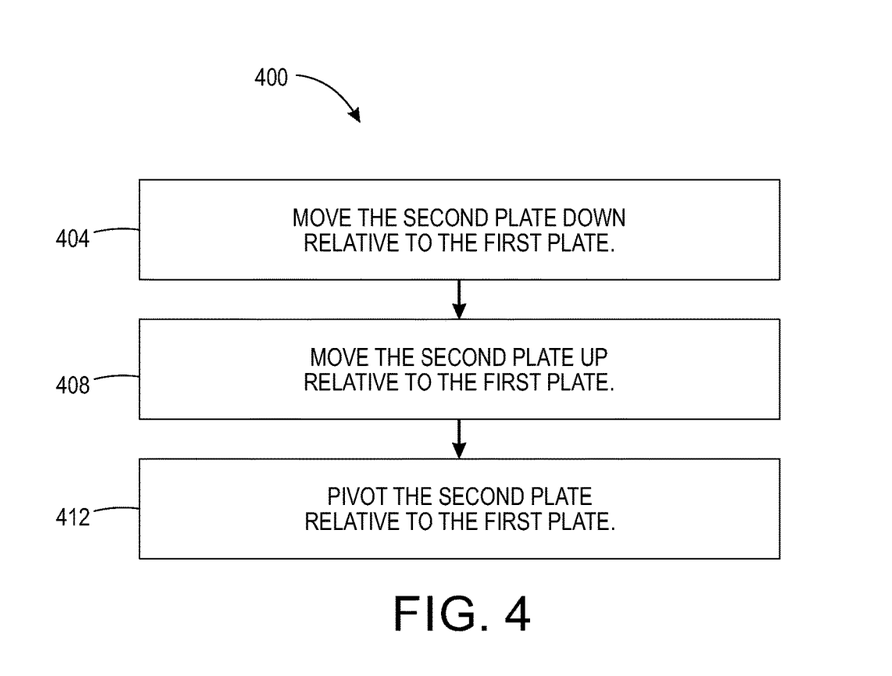
FIG. 4 shows a method for operating at least one of a first plate and a second plate to release a printed part.
Figure 5A:
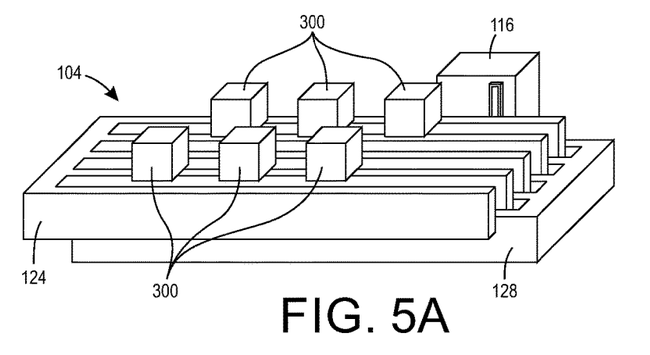
FIGS. 5a, 5b, and 5c demonstrate the method of FIG. 4 without a wax base.
Figure 6A:
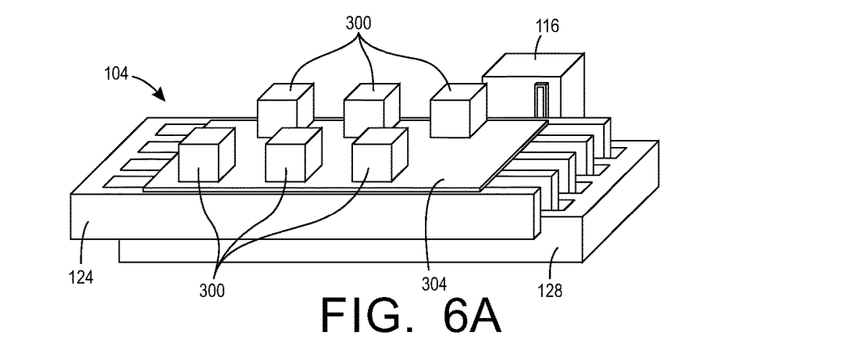
FIGS. 6a, 6b, and 6c demonstrate the method of FIG. 4 with a wax base.

A method 400 for operating at least one of the first and second plates to release the three-dimensional object from the platen is shown in FIG. 4. The method 400 is one embodiment of the step corresponding to block 212 of the method 200. Once a three-dimensional object is formed on the platen, the method 400 moves the second plate down relative to the first plate (block 404). The controller 120 operates the actuator 116 to move the second plate 128 down relative to the first plate 124. In moving the second plate 128 down, the parts 300 become separated from the second plate 128, as shown in FIG. 5a. In the case where the wax base 304 is ejected, the wax base 304 becomes separated from the second plate 128, as shown in FIG. 6a.

Figure 5B:
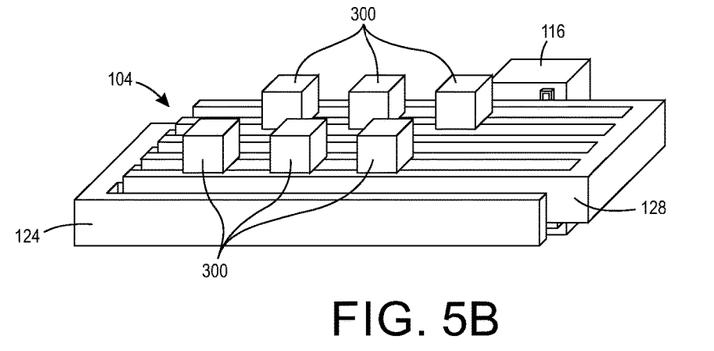
Figure 6B:
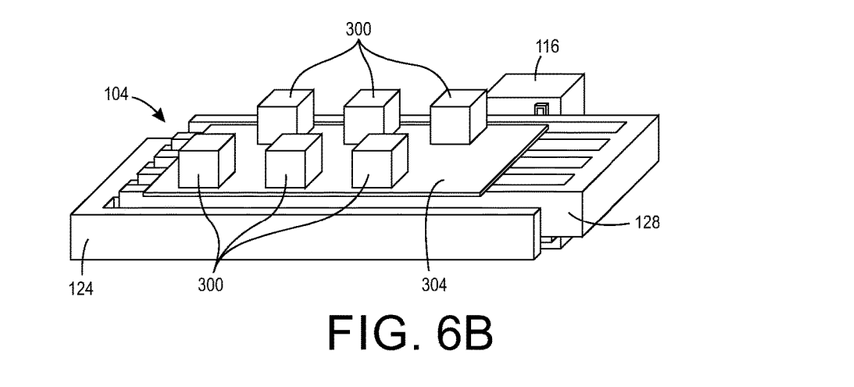

Next, the method 400 moves the second plate up relative to the first plate (block 408). The controller 120 operates the actuator 116 to move the second plate 128 up relative to the first plate 124. Particularly, the actuator 116 moves the second plate 128 past the first plate 124 so as to separate the parts 300 from the first plate 124, as shown in in FIG. 5b. In the case where the wax base 304 is ejected, the wax base 304 is separated from the first plate 124, as shown in FIG. 6b. By performing the described sequence of movements, the printer 100 breaks any adhesion between the parts 300 or the wax base 304 and the surface 112 of the platen 104 so the parts 300 or the wax base 304 are more easily removed from the platen 104.

Figure 5C:
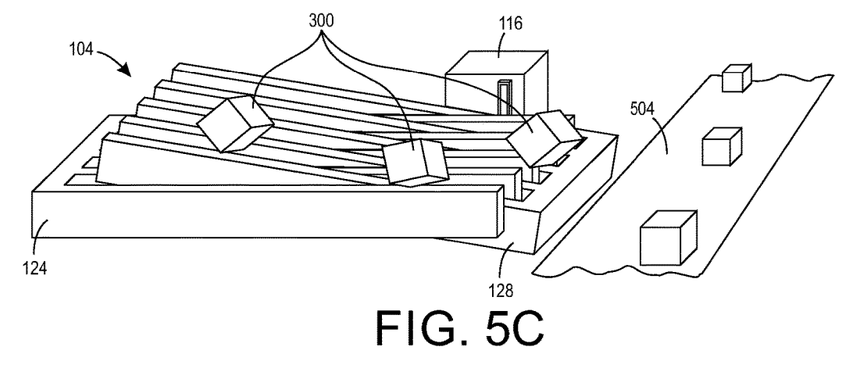
Figure 6C:
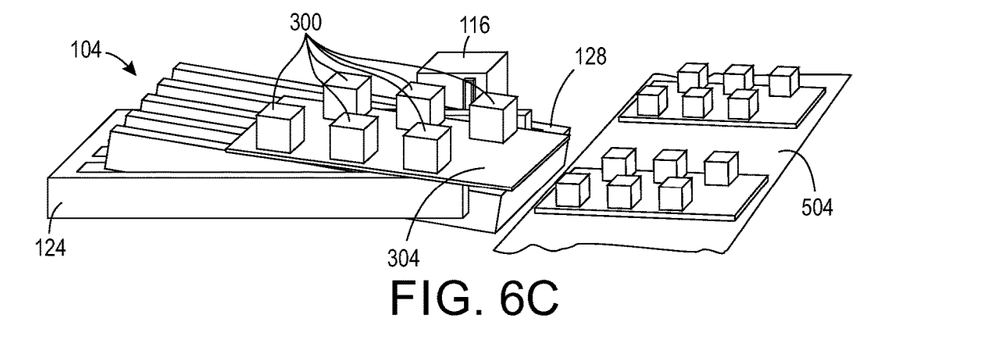

Next, the method 400 pivots the second plate relative to the first plate (block 412). The controller 120 operates the actuator 116 to pivot the second plate 128 relative to the first plate 124, as shown in FIG. 5c and FIG. 6c. In one embodiment in which the wax base 304 is not formed, the parts 300 tumble off the second plate 128 onto a conveyor 504, as shown in FIG. 5c. When the wax base 304 is not formed, the orientation of the parts 300 is not necessarily maintained during removal. In another embodiment in which the wax base 304 is formed, the wax base 304 and the parts 300 slide off the second plate 128 onto the conveyor 504, as shown FIG. 6c. When the wax base 304 is formed, the orientation of the parts 300 is maintained during removal.

Figure 7:
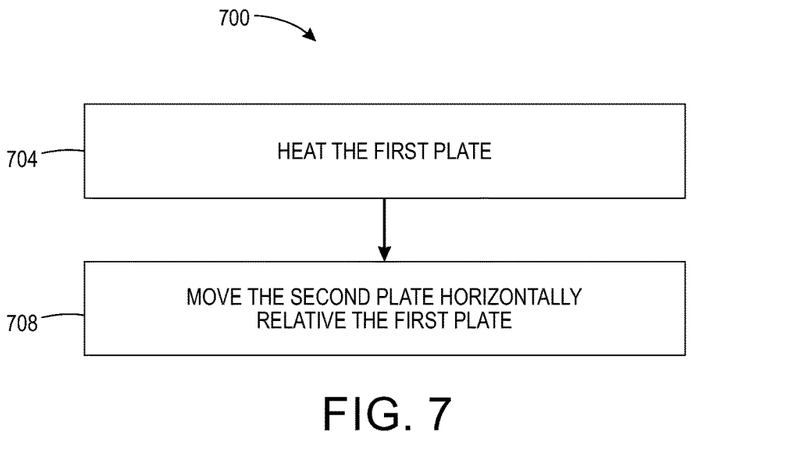
FIG. 7 shows a different method for operating at least one of a first plate and a second plate to release a printed part.

A method 700 for operating at least one of the first and second plates to release the three-dimensional object from the platen is shown in FIG. 7. The method 700 is another embodiment of the step corresponding to block 412 of the method 200. Once a three-dimensional object is formed on the platen, the method 700 heats the first plate (block 704). The controller 120 operates the heating elements 148 to heat the first plate 124. By heating the first plate 124, the printer 100 weakens any adhesion between the parts 300 and the first plate 124.

Figure 8A:
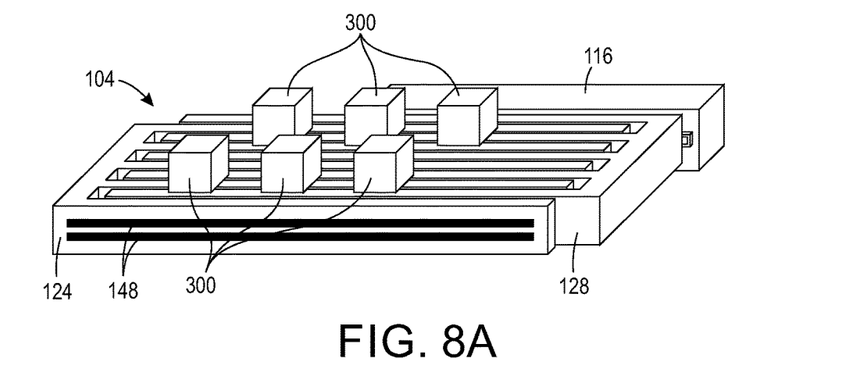
FIGS. 8a, 8b, and 8c demonstrate the method of FIG. 7.
Figure 8B:
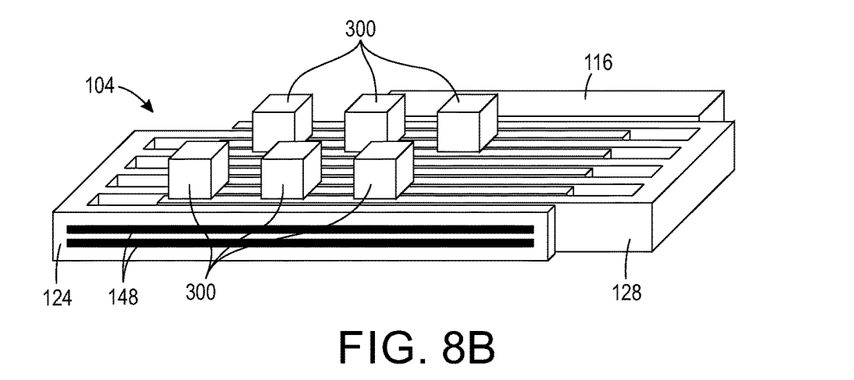
Figure 8C:
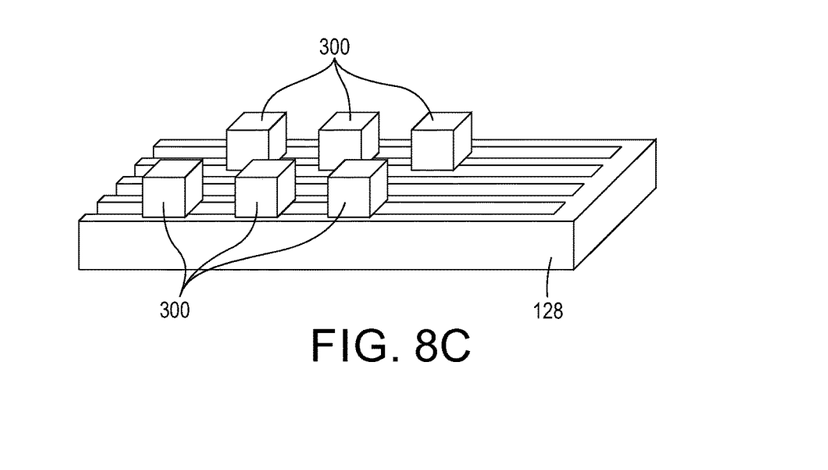

Next, the method 700 moves the second plate horizontally relative to the first plate (block 708). The controller 120 operates the actuator 116 to move the second plate 128 horizontally relative to the first plate 124 to at least partially separate the second plate 128 from the first plate 124, as shown in FIG. 8a and FIG. 8b. In moving the second plate 128, shear forces break any remaining adhesion between the parts 300 and the heated first plate 124. In some embodiments, the controller 120 then disengages with the second plate 128 to enable it to be removed completely from the printer 100 with the parts 300 stuck to it, as shown in FIG. 8c. In one embodiment, the parts 300 remain stuck to the second plate 128 during post-processing steps, such as wax removal. In this way, the parts are kept together as a group and their orientations are maintained.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A method of manufacturing a three-dimensional object comprising:
   operating at least one actuator with a controller to move a first plate with reference to a second plate to form a platen, the first plate having a plurality of parallel members and the second plate having a plurality of parallel members, the first plate being moved with reference to the second plate to interlock the plurality of parallel members of the first plate with the plurality of parallel members of the second plate to form the platen, the first plate being independently movable with reference to the second plate;
   operating a plurality of ejectors with a controller to eject drops of material towards the platen and form layers of material with reference to digital image data of a three-dimensional object to produce the three-dimensional object on the platen;
   operating the at least one actuator with the controller to move the first plate in a first direction that is normal to a surface of the platen while the second plate remains stationary;
   operating the at least one actuator with the controller to move the first plate in a second direction that is opposite to the first direction while the second plate remains stationary; and
   operating the at least one actuator to pivot the first plate about an axis that is parallel to the surface of the platen and perpendicular to a longitudinal axis of each of the plurality of parallel members to release the three-dimensional object from the platen from the pivoted first plate.

2. The method of claim 1, the operation of the at least one actuator to move the first plate further comprising:
   operating a heater with the controller to heat at least one of the first plate and the second plate.

3. The method of claim 1, the operation of the plurality of ejectors further comprising:
   operating a first plurality of ejectors with the controller to eject wax onto the platen to form a wax base on the platen; and
   operating a second plurality of ejectors with the controller to eject material onto the wax base to form the three-dimensional object, the wax base having a footprint that is larger than a footprint of the three-dimensional object.

4. A printer for manufacturing a three-dimensional object comprising:
   a plurality of ejectors configured to eject drops of material;
   a first plate having a plurality of parallel members;
   a second plate having a plurality of parallel members;
   at least one actuator operatively connected to the first plate; and
   a controller operatively connected to the at least one actuator and the plurality of ejectors, the controller being configured to:
      operate the at least one actuator to move the first plate with reference to the second plate to interlock the plurality of parallel members of the first plate with the plurality of parallel members of the second plate to form a platen;
      operate the plurality of ejectors to eject the drops of material towards the platen and form layers of material with reference to digital image data of a three-dimensional object to produce the three-dimensional object on the platen;
      operate the at least one actuator to move the first plate in a first direction that is normal to a surface of the platen while the second plate remains stationary;
      operate the at least one actuator with the controller to move the first plate in a second direction that is opposite to the first direction while the second plate remains stationary; and
      operate the at least one actuator to pivot the first plate about an axis that is parallel to the surface of the platen and perpendicular to the longitudinal axis of each of the plurality of parallel members to release the three-dimensional object from the platen from the pivoted first plate.

5. The printer of claim 4 further comprising:
   a heater operatively connected to one of the first plate and the second plate; and
   the controller being operatively connected to the heater and the controller being further configured to:
      operate the heater to heat at least one of the first plate and the second plate.

6. The printer of claim 4, the controller being further configured to:
   operate a first group of ejectors in the plurality of ejectors to eject wax onto the platen to form a wax base on the platen; and
   operate a second group of ejectors in the plurality of ejectors to eject material onto the wax base to form the three-dimensional object, the wax base having a footprint that is larger than a footprint of the three-dimensional object.

* * * * *